No. 773,212. PATENTED OCT. 25, 1904.
S. B. MARTIN & D. C. TROTT.
CHAIN MAKING MACHINE.
APPLICATION FILED JUNE 10, 1902.
NO MODEL. 8 SHEETS—SHEET 1.
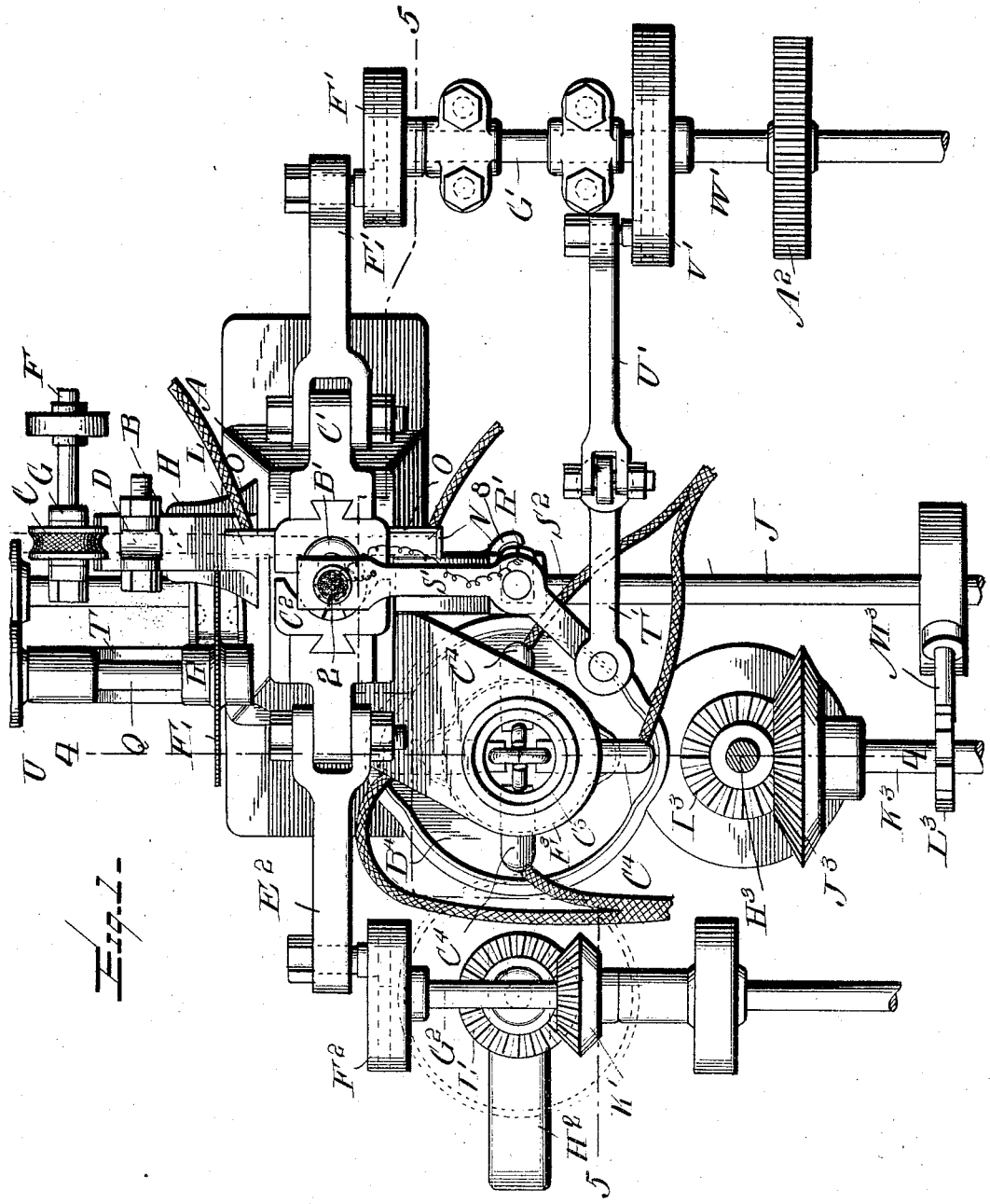
WITNESSES:
Wm. F. Doyle
A. J. Brooks
INVENTORS
Sidney B. Martin,
David C. Trott,
BY W. A. Redmond
Attorney

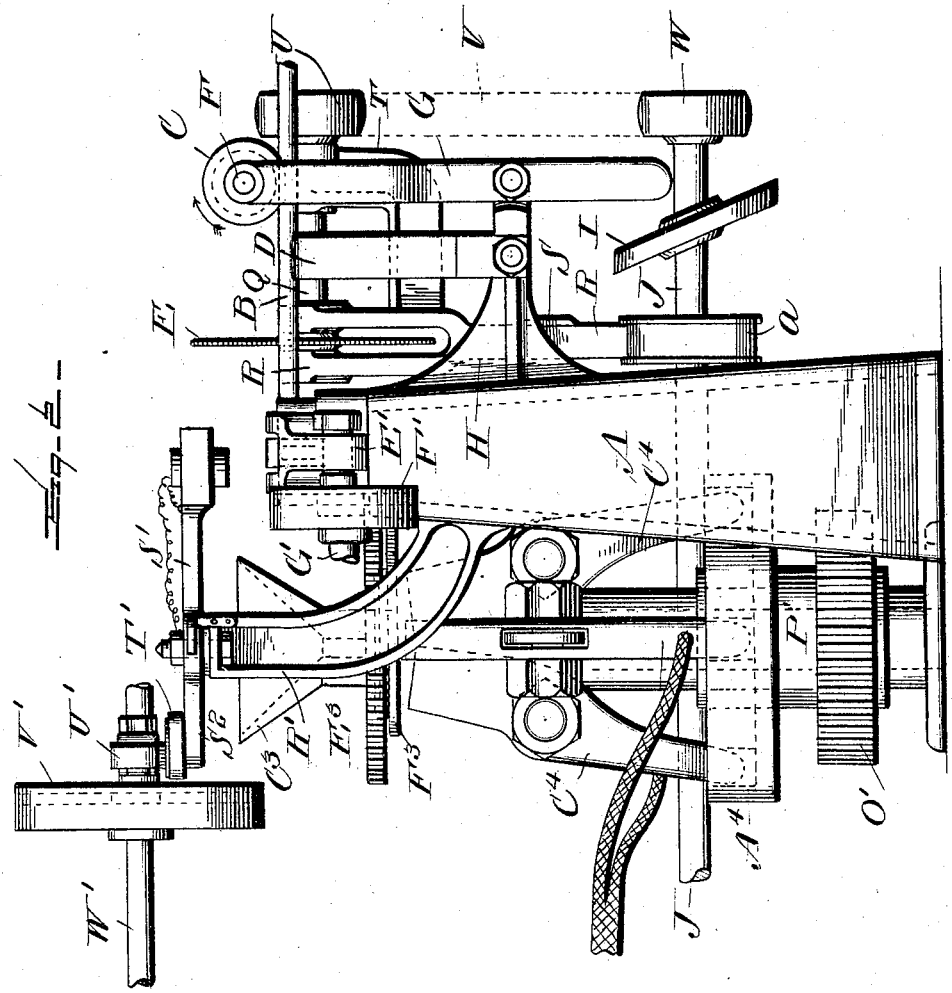

No. 773,212. PATENTED OCT. 25, 1904.
S. B. MARTIN & D. C. TROTT.
CHAIN MAKING MACHINE.
APPLICATION FILED JUNE 10, 1902.
NO MODEL. 8 SHEETS—SHEET 3.
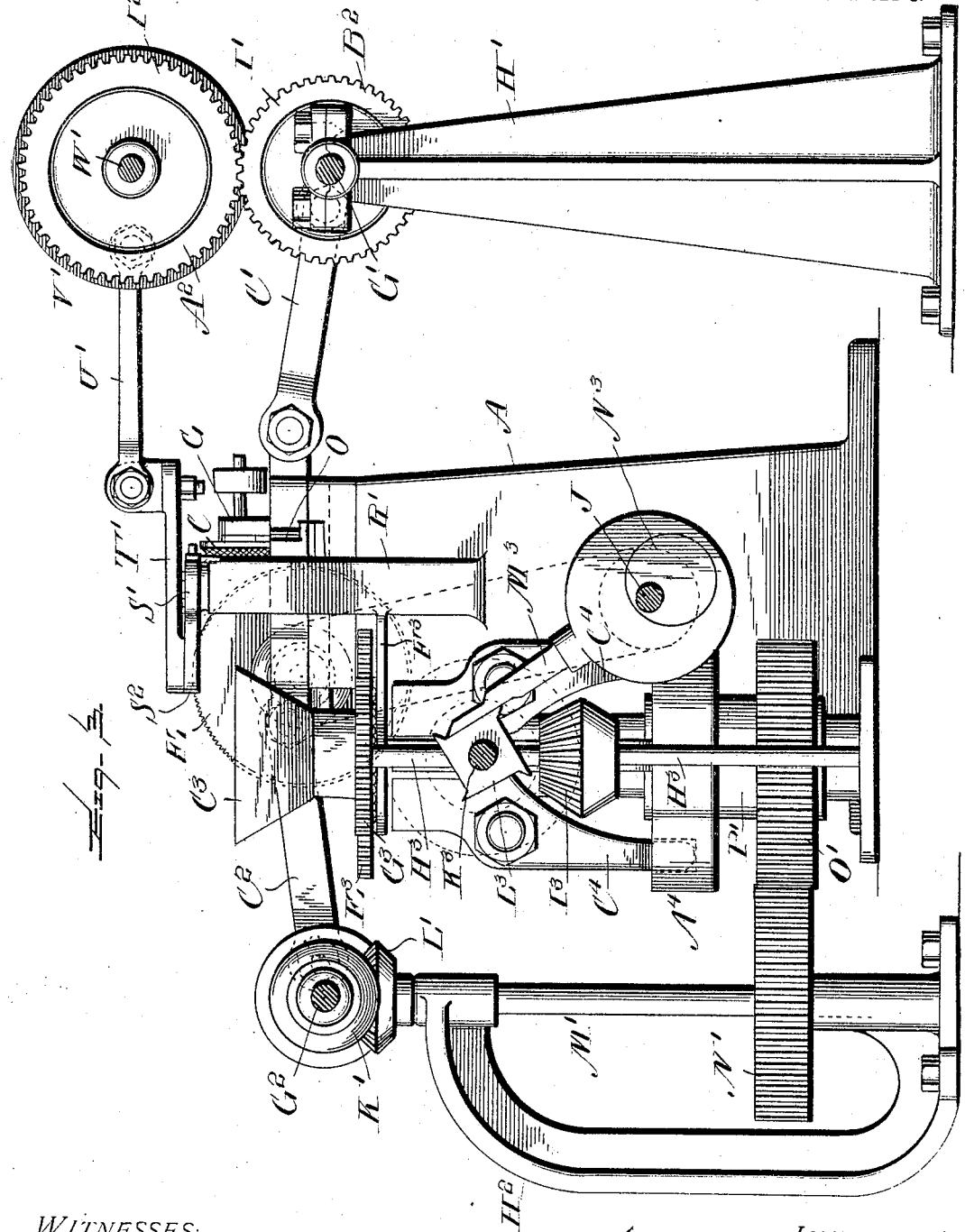

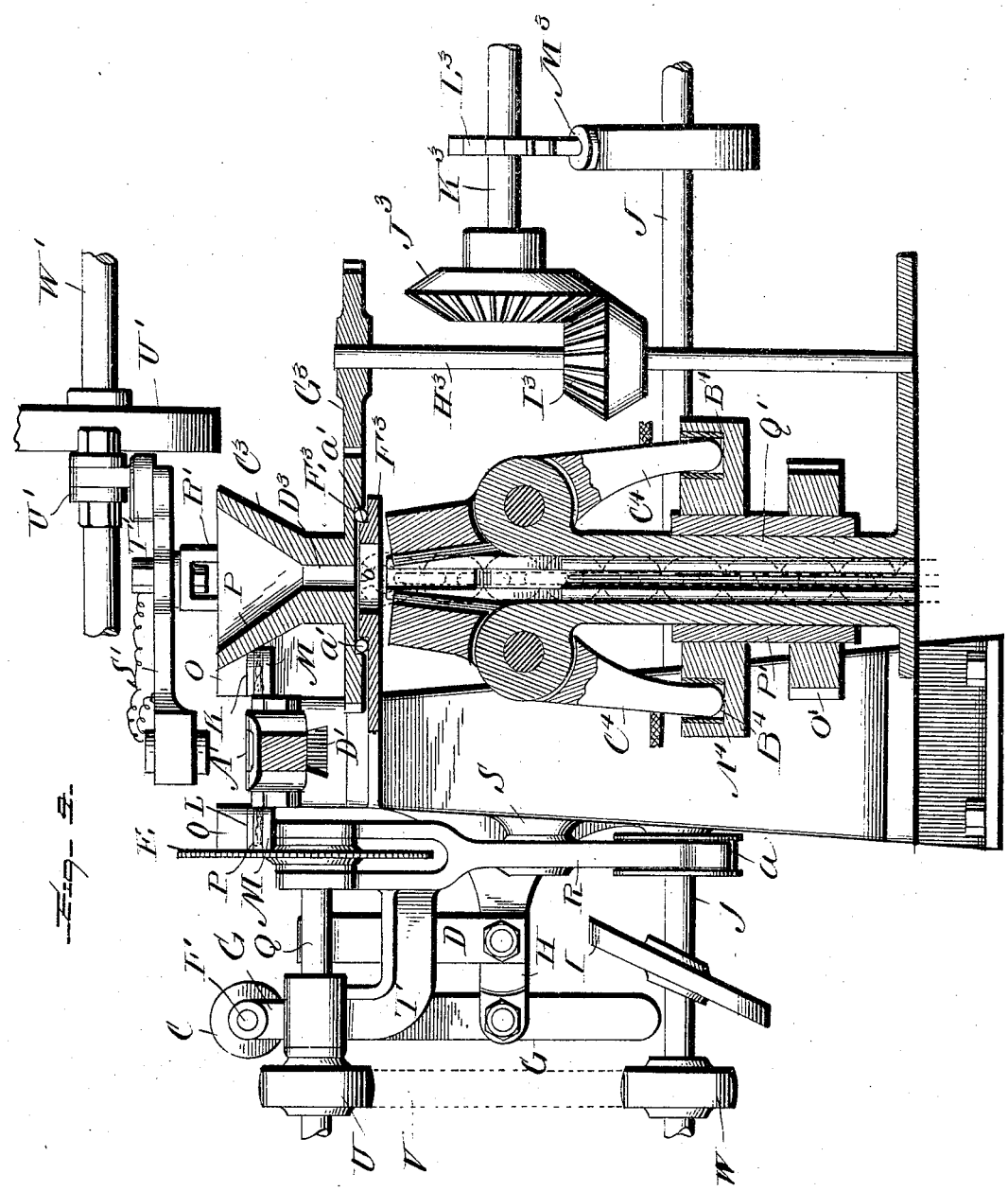

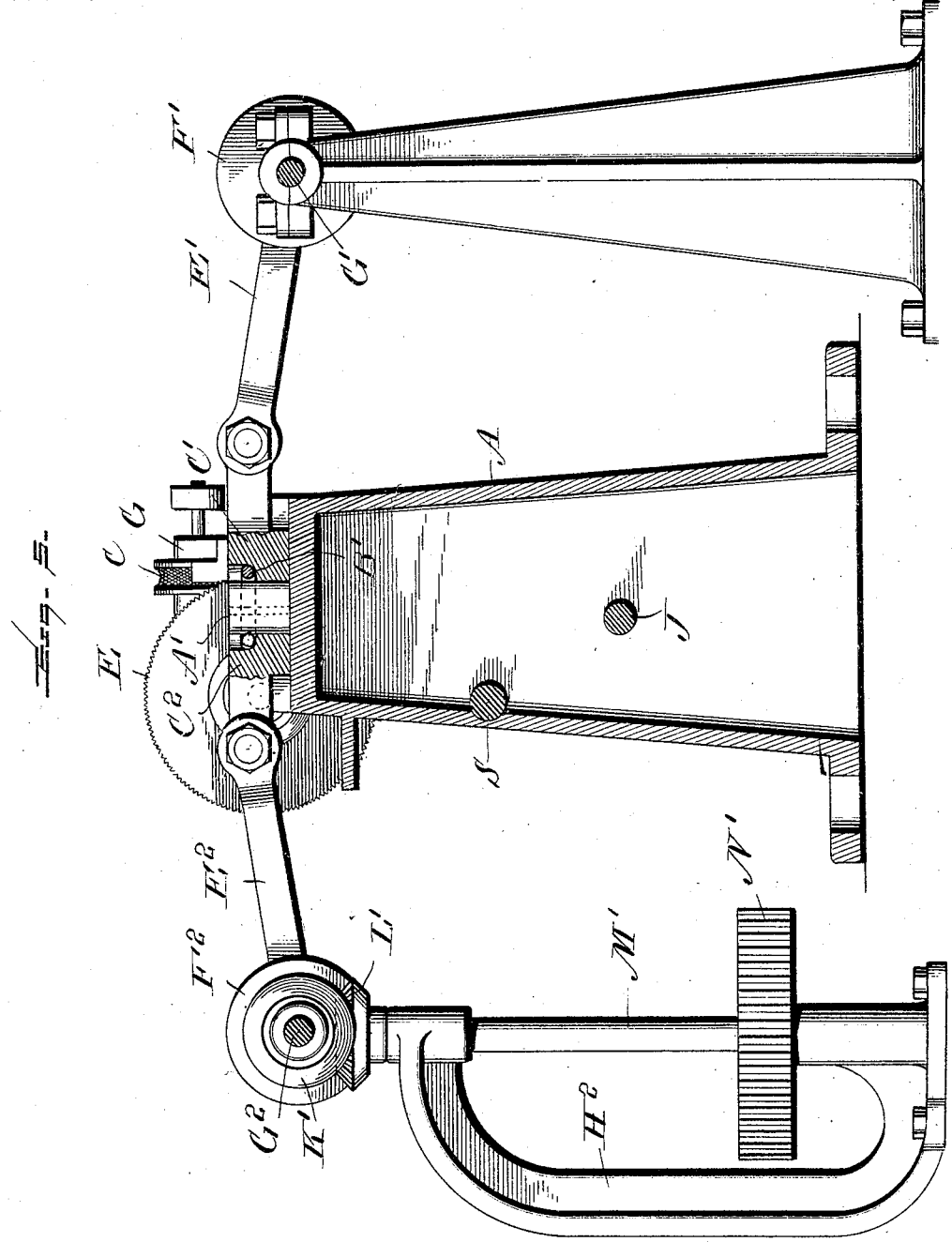

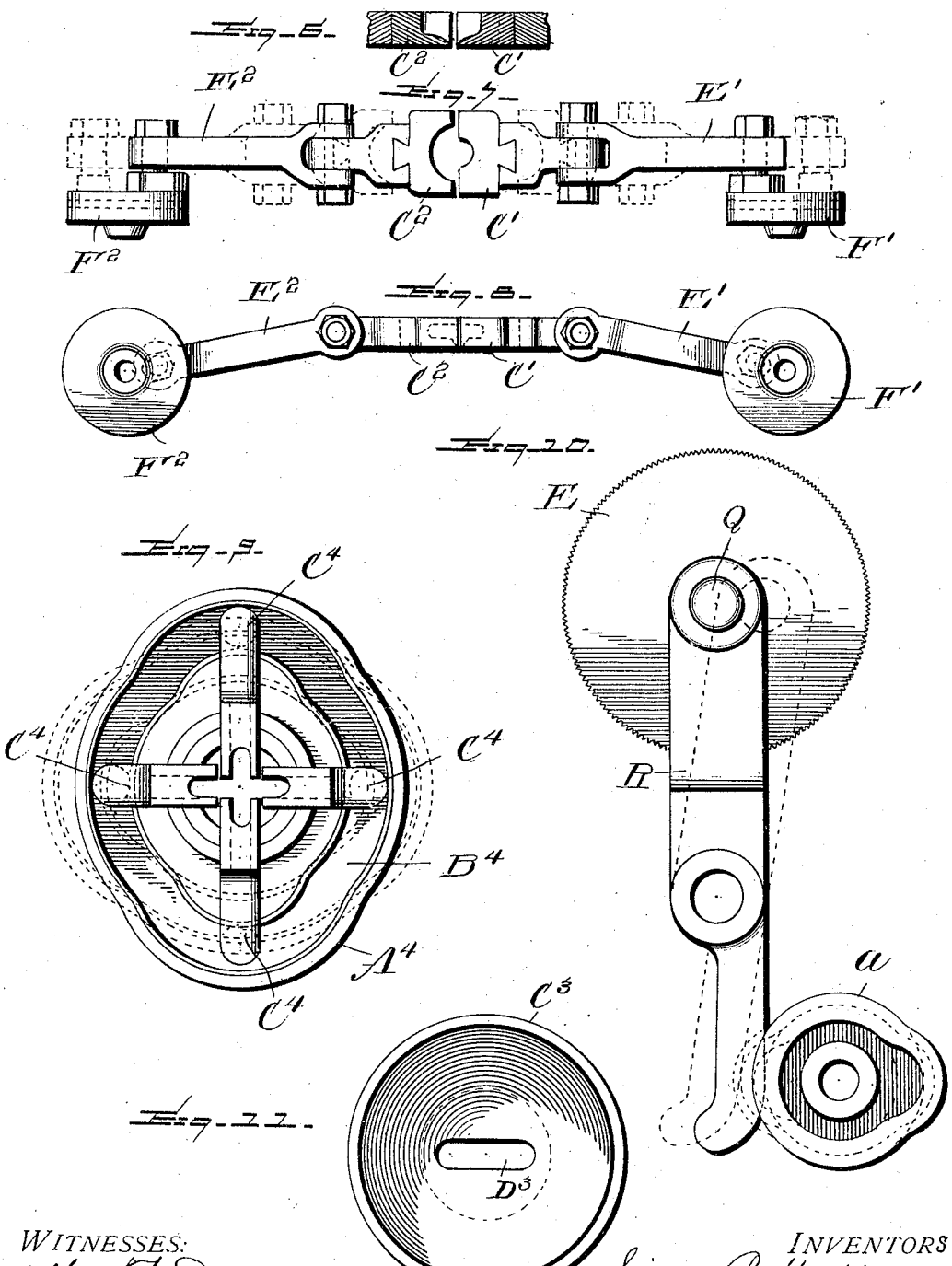

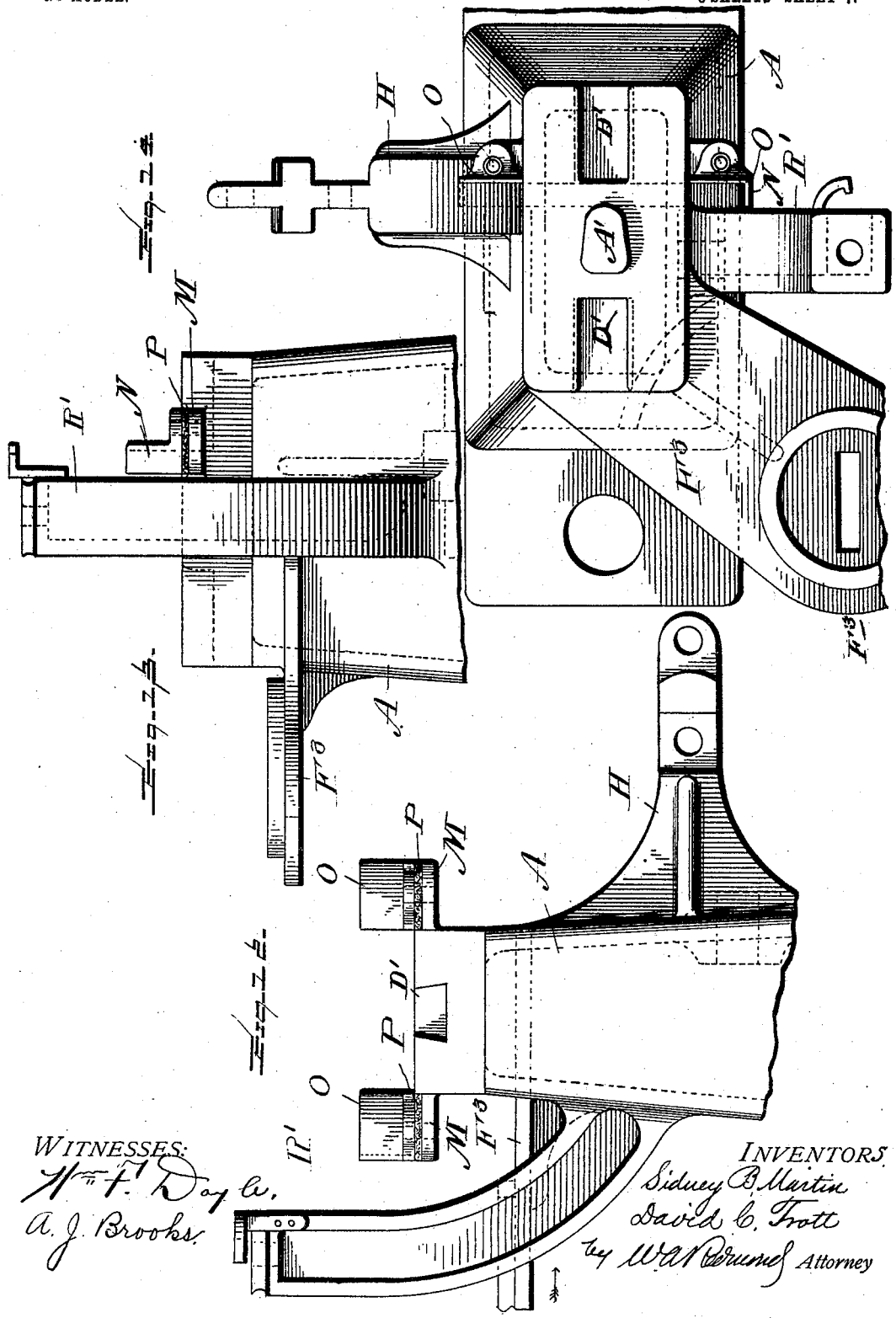

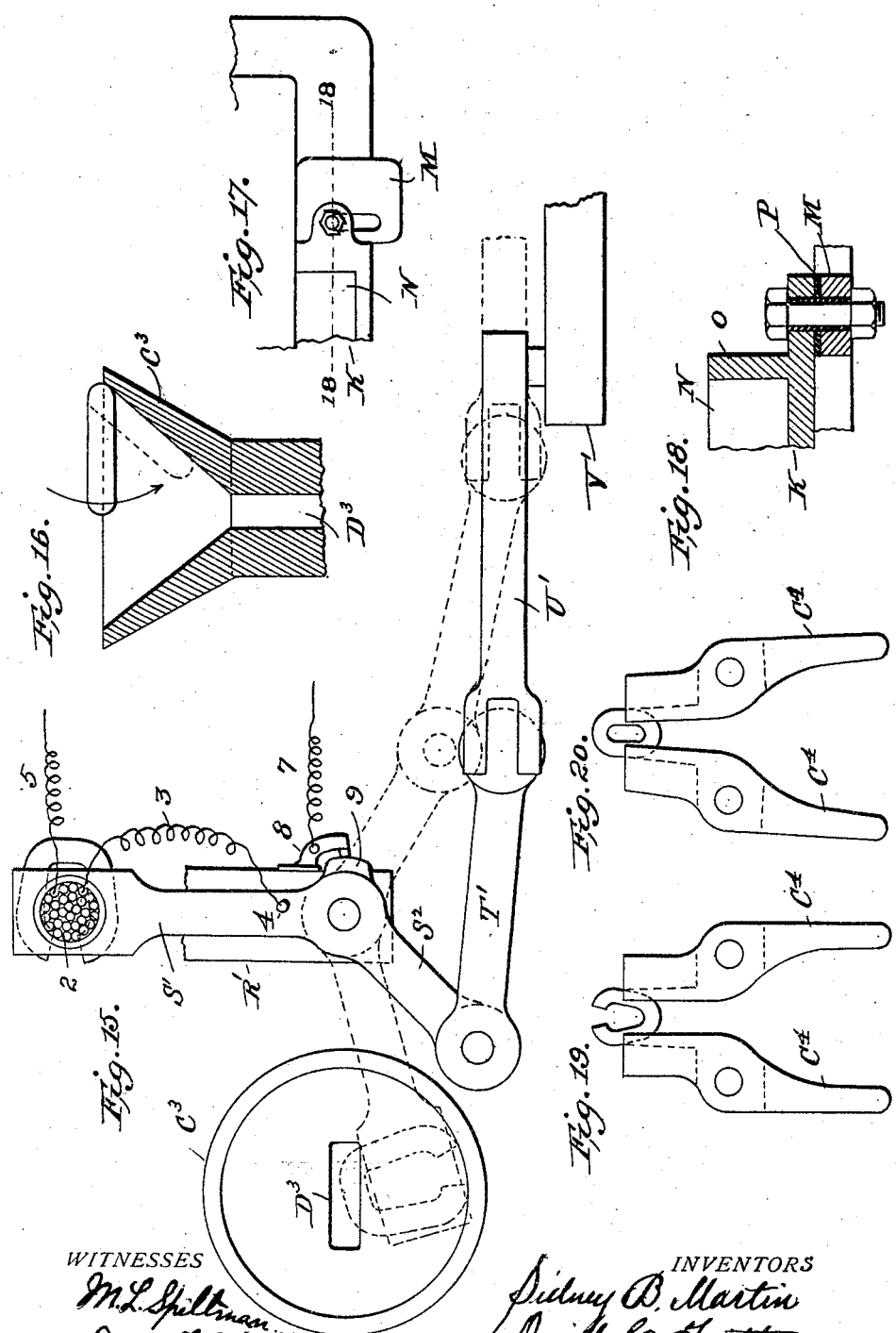

No. 773,212. Patented October 25, 1904.

UNITED STATES PATENT OFFICE.

SIDNEY B. MARTIN AND DAVID C. TROTT, OF PITTSBURG, PENNSYLVANIA.

CHAIN-MAKING MACHINE.

SPECIFICATION forming part of Letters Patent No. 773,212, dated October 25, 1904.

Application filed June 10, 1902. Serial No. 111,030. (No model.)

*To all whom it may concern:*

Be it known that we, SIDNEY B. MARTIN and DAVID C. TROTT, citizens of the United States, residing at Pittsburg, in the county of Allegheny and State of Pennsylvania, have invented certain new and useful Improvements in Chain-Making Machines; and we do declare the following to be a full, clear, and exact description of the invention, such as will enable others skilled in the art to which it appertains to make and use the same.

This invention relates to chain-making machines; and it has for its object to provide an automatically-operating machine for rapidly and comparatively inexpensively heating and bending the links directly from the stock, threading said links one upon the other, and welding the same; and it consists in the parts and combinations of parts hereinafter described and claimed.

In the accompanying drawings, forming a part of this specification, Figure 1 is a plan view of an apparatus embodying our invention; Fig. 2, a side elevation of the same; Fig. 3, a rear elevation; Fig. 4, a side elevation, partly in vertical section on the line 4 4, Fig. 1; Fig. 5, a vertical section on the line 5 5, Fig. 1; Figs. 6, 7, and 8, detail views, in vertical section, plan, and side elevation, respectively, of the bending mechanism; Fig. 9, a detail plan view of the eccentric or cam for operating the transformer-terminals; Fig. 10, a detail side elevation of the cutting mechanism; Fig. 11, a detail plan view of the hopper; Fig. 12, a detail side elevation of a portion of the frame; Fig. 13, a detail side elevation viewed in the direction of the arrow, Fig. 12; Fig. 14, a detail plan view of Fig. 12; Fig. 15, a detail plan view of hopper and link lifting arm, showing electrical connections; Fig. 16 a detail view, in vertical section, through the hopper; Fig. 17, a detail plan view of the stop-rest K; Fig. 18, a vertical section on the line 18 18, Fig. 17; Fig. 19, a detail side elevation of a pair of terminals, showing a link held therein in position to be closed; and Fig. 20, a similar view showing the position of the terminals after the link has been closed.

Similar characters refer to similar parts throughout all the views.

Referring to the drawings, A represents the table or main support, on and around which are supported and assembled the various devices or mechanisms for carrying out our invention, which mechanisms will be described in the order of their operation in carrying out the invention.

*The stock-feeding mechanism.*—The stock, in the shape of a bar, rod, or wire B, is passed under a grooved and corrugated or roughened roller C onto a stationary support D, having a groove therein to receive the stock, and to the saw or other cutting-tool E. The roller C is mounted on a shaft F between the bifurcated ends of a rock-arm G, on which the shaft F is journaled. The arm G is pivotally secured to the end of a bracket H, projecting from the main support or table A, and to which bracket is also rigidly secured the lower end of the stationary support D for the stock. The lower end of the arm G extends into the path of a cam I, mounted on the main shaft J, and is engaged by said cam and moved or swung on its pivot once during each revolution of said shaft J to throw the upper end of said arm toward the machine, and thus cause the roller C to engage and feed forward the stock to the cutting-tool. The shaft F is operated from the main shaft J by belt or gear and rotates constantly during the operation of the machine; but the roller C, rotating in the direction of the arrow, Fig. 2, engages and feeds forward the stock at intervals only, as above described.

In order to limit the longitudinal movement of the stock and to hold the same against the thrust of the cutting-tool, we provide rests K and L, one at each side of the table A, which are secured by bolts or screws to bosses M, projecting from the table, said bosses being slotted for the passage of the screws or bolts, so that the rests may be adjusted. The rest K is provided or formed with an upright end piece N, Fig. 1, forming a stop, against which the end of the stock abuts to limit the distance the stock is moved at each operation of the roller C, and both rests K and L have the vertical side pieces O to hold the stock against the thrust of the cutting-tool. The rests are made of some good conducting metal, such as copper or aluminium. Fiber washers P are interposed between the rests K and L and their bosses M, and fiber bushing is arranged in the openings in said rests and bosses through which the securing-bolts pass (see Fig. 12) in order to insulate said parts.

*The cutting mechanism.*—The saw E is secured on a shaft Q, journaled at one end in the forked end of a rocking lever R, which is pivotally mounted on a stud S from the main support A, and from which lever projects a lateral arm or bracket T, on which the opposite end of shaft Q is journaled. A pulley U is mounted on the outer end of shaft Q and is connected by a belt V to a pulley W, mounted on the main shaft J. The lower end of the rock-lever R rests in the peripheral groove of a cam $a$ on the main shaft J, and said lever R is thereby tilted or rocked once during each revolution of the main shaft, so as to carry the saw to and hold it in cutting engagement with the stock until the latter is severed.

The cams I and $a$ are so arranged on the main shaft that they act successively, the parts being so timed relative to each other that the cam I operates upon the arm G to tilt the same, and thus feed the stock forward or into position to be severed at the proper point before the cam $a$ acts to bring the saw against the stock. The rest K is adjustably secured to the table, so that it may be adjusted to limit the longitudinal movement of the stock at any desired point.

*The link-bending mechanism.*—An elliptical former or mandrel A' is firmly secured to the table A at a point to one side of the longitudinal line of movement of the stock, around which the cut-off length of stock is bent by dies, so as to form an open-ended link B', Fig. 1. The dies C' C² are arranged one at each end of the elliptical mandrel and slide in dovetail grooves D', formed in the top of the table A. To the dies are connected the rods E' E², the other ends of which are connected to the crank-disks F' F², mounted, respectively, on horizontal shafts G' G², carried by the standards H' H², said shaft G' being so actuated by a belt or gear from the main shaft J to a pulley or gear on said shaft G', while the shaft G² is driven through a bevel-gear K' thereon, meshing with a similar gear L' on an upright shaft M', the latter being driven through a gear-wheel N', mounted thereon and meshing with a similar gear O', carried by a bushing P', mounted on a hollow standard Q'.

The die C' operates to bend the stock into a U shape, while the die C² bends or turns the ends of the link toward each other.

*The mechanism for feeding the open-ended link to the welding device from the bending device.*—To a bracket or arm R', projecting from the main frame, a lever S' is pivoted so as to be capable of turning horizontally, said lever having a short arm S², extending at an angle from its pivotal point, to which is connected one end of a link T', the other end of said link being connected to a pitman U' the other end of which is connected to a crank-disk V', mounted on the shaft W'. The shaft W' is driven by a gear A² thereon, meshing with a similar gear B², mounted on shaft G', so that a swinging movement is imparted to said lever S' to carry its end over the bending mechanism. The end of the lever S' which is swung over the bending device may be provided with any suitable mechanical or electrical device for grasping the link and carrying it to the hopper.

In the drawings, Figs. 1 and 15, is indicated means for lifting the link by electricity, in which the numeral 2 represents an electromagnet on the arm S', connected by a wire 3 to a post 4 and a wire 5 to the source of current. A contact-finger 8 is insulated from the frame and in position to engage a contact-piece 9 on the hub of arm S' and connected to the source of current by a wire 7, whereby the magnet may be energized in order to attract and draw up or lift the link from the mandrel.

The hopper C³ is formed with an elliptical or elongated discharge-opening D³ and has a horizontal circular flange E³, the periphery of which is toothed. The hopper rests on balls $a'$, arranged on a table F³, extending from the main support, through which an opening $b'$ is formed in line with the hopper-opening and also in line with the hollow bearing Q'. Motion is imparted to the hopper by a pinion G³ on a vertical shaft H³, to which motion is intermittently imparted from the main shaft J through the bevel-gear I³, a bevel gear J³ on a horizontal shaft K³, a ratchet-wheel L³ on the last-named shaft, and a pawl M³, secured to an eccentric-strap on the eccentric N³ carried by the main shaft, where by a quarter-turn is imparted to the hopper once during each revolution of the main shaft in order to permit the closed end of the link deposited therein to drop between the open ends of the preceding link, which is being held in position below the discharge-opening of the hopper by the welding-terminals, which will be hereinafter described. As will be observed, the hopper is flaring or formed conical, and the link is carried over or above said hopper by the lifting device to a point beyond the center of the hopper, as shown best in Fig. 15, in which position the closed or bent end of the link is practically in line with the center of the hopper. When the link has reached the point shown, the current is cut off or contact broken by the contact-piece 9 on the arm S' being carried away from and off contact-finger 8, thus demagnetizing the magnet and permitting the link to drop. In dropping the open end of the link first strikes the wall of the hopper, owing to the inclining or tapering shape of the latter, and the link is tilted, as indicated in dotted lines, Fig. 16, so that its bent or closed end is brought forward, and it slides in that position down the hopper and into the discharge-opening thereof with bent or closed end in advance.

*The link-welding mechanism.*—On the bushing P' is secured a cam-wheel $A^4$, which is rotated with said bushing. In the upper face of the wheel $A^4$ is formed a cam-groove $B^4$, into which extends the lower ends of the pivoted arms $C^4$, which form the welding-terminals. The arms $C^4$, four in number, are pivotally secured to and around the top of the standard Q', and their short upper ends are grooved on their adjacent or opposing faces to receive the links therein and are so arranged relative to each other as to be alternately operated in pairs by the cam-wheel once during each revolution of said cam-wheel so as to move the upper ends of the two opposite arms toward each other, and thus press the open ends of the link held therein together.

The stock in the shape of a long bar, a rod, or wire is first passed under the roller C and onto the support D and power applied to the main shaft. The cam I engages the end of arm or lever G and tilts the same so as to move the roller C down to and into engagement with the stock. The roller C is constantly rotating through its connection with the main shaft, as hereinbefore described, and acts to feed the stock longitudinally over the rest L and across the path of the bending-dies C' $C^2$ until its movement is arrested by the rest K. The rests K and L are adjustably secured in place so that they may be adjusted for links of different lengths and may be readily removed in order to replace them with rests adapted for stock of different diameters. After the stock has been moved into the proper position and come to rest the arm or lever R is operated upon by the cam $a$ to bring the saw into engagement with the stock. The saw being constantly rotating and being pressed steadily against the stock severs the latter and then gravitates to its normal position out of the path of the stock in readiness to be again brought into engagement with the stock at the next revolution of the main shaft. A current of electricity is passed through the stops K and L, (see Fig. 1,) which, as above described, are insulated by the fiber washers and bushing to heat the cut-off lengths of stock so that it may be readily bent around the mandrel or former A' into an open-ended link by the dies $C^2$ acting to turn the ends of the link toward each other, but not into contact. After the dies have acted and been withdrawn the lifter-arm S', to which any suitable mechanical or electrical lifting device is attached, picks up the link and carries the same to and deposits it in the hopper $C^3$, with its closed end downward. From the hopper the link drops between the arms or terminals $C^4$ and lodges in the grooves at the upper end of one pair thereof. The hopper is rotated a quarter-turn in order to bring its elongated opening $D^3$ across the open end of the link and another bent link is brought to and dropped into the hopper, so that it will pass through the said opening and its closed end enter the open end of the preceding link. The pair of terminals of the heating-transformer holding the first link are now acted upon to press the ends of the link together. The lower ends or arms of the terminals are insulated from cam-wheel $A^4$ and a heavy current of electricity (see Fig. 1) passes through the entire terminal $C^4$, so that as they are brought together in pairs alternately they are short-circuited by the link, causing the latter to heat to fusion or welding temperature at the point where the link is pressed together.

The link when first dropped between the jaws of either pair of terminals has one closed end, the other end being open, and, of course, the open end being wider than the closed end the link is held by the terminals until the next movement of the machine drops a link with its closed end downward into or between the ends of the preceding link. The terminals holding the link are then brought together and presses the ends of the link together and welds them, as above described. The terminals are then swung apart, permitting the link which has been welded to drop down between them, while the last link or that one which has been linked by the pressing and welding movement is caught between the jaws of the opposite pair of jaws, and thus supports the link just formed. (See Figs. 19 and 20.)

The finished chain is pulled intermittently through the hollow standard by a chain-sheave.

All electrical connections can be made at any convenient point.

Having thus described our invention, what we claim as new, and desire to secure by Letters Patent, is—

1. In a chain-making machine, a device for transferring the bended link from the bending mechanism to the threading mechanism, said device comprising a pivoted lever or arm having one end provided with means for grasping a bended link, means for swinging said lever or arm horizontally over the threading device, and means for causing the link to be delivered to the threading mechanism with its closed end in advance.

2. In a chain-making device, the combination with a link-bending device, a link-welding device, and a device for conveying the link from the bending to the welding device, of a link-threading device arranged over the welding device and adapted to receive the links and means for intermittingly rotating said threading device so as to deposit each successive link with its closed end in the open end of the preceding link.

3. In a chain-making machine, the combination of a link-threading device comprising a hopper having an elongated slot to receive the link, means for partially rotating said hopper at intervals, a welding device comprising pivoted arms arranged in pairs to alternately receive and hold the links as they leave the hopper, and means for operating said arms alternately in pairs to close the open ends of said links.

4. In a chain-making machine, the combination of a stock-feeding device, a cutting device for severing the stock into link sizes, means for heating the link-pieces, a bending device, a hopper, means for automatically delivering the bent links to the hopper, means for heating the bent blanks, and a welding device.

In testimony whereof we affix our signatures in presence of two witnesses.

SIDNEY B. MARTIN.
DAVID C. TROTT.

Witnesses:
B. F. JACOBS,
J. M. CORBOY.